(12) United States Patent
King

(10) Patent No.: US 10,183,616 B2
(45) Date of Patent: Jan. 22, 2019

(54) DISPLAY SYSTEM TO DISPLAY OUTSIDE THE VEHICLE

(71) Applicant: Valeo North America, Inc., Troy, MI (US)

(72) Inventor: Robert King, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 13 days.

(21) Appl. No.: 15/626,780

(22) Filed: Jun. 19, 2017

(65) Prior Publication Data

US 2018/0361916 A1    Dec. 20, 2018

(51) Int. Cl.
| | | |
|---|---|---|
| *B60Q 7/00* | (2006.01) | |
| *B60Q 1/50* | (2006.01) | |
| *G09G 3/20* | (2006.01) | |
| *B60Q 1/04* | (2006.01) | |
| *F21S 41/32* | (2018.01) | |

(52) U.S. Cl.
CPC ............... *B60Q 1/50* (2013.01); *B60Q 1/04* (2013.01); *F21S 41/32* (2018.01); *G09G 3/2096* (2013.01); *G09G 2380/10* (2013.01)

(58) Field of Classification Search
CPC .. B60Q 1/50; B60Q 1/04; B60Q 1/503; F21S 48/1317; G09G 3/2096; G09F 21/04; G09F 21/048; B60R 7/081; H01L 51/5262

USPC ................ 340/593, 471, 464; 345/30
See application file for complete search history.

(56) References Cited

U.S. PATENT DOCUMENTS

| | | | | |
|---|---|---|---|---|
| 3,827,808 A | * | 8/1974 | Cho ............... | G01N 21/86 250/228 |
| 4,864,754 A | * | 9/1989 | Sangu ............. | B60Q 1/503 40/593 |
| 2005/0024293 A1 | * | 2/2005 | Sakata ............ | H01L 51/5262 345/30 |
| 2005/0099287 A1 | * | 5/2005 | Su ................. | B60Q 1/22 340/464 |
| 2010/0103485 A1 | * | 4/2010 | Haussler ......... | G03H 1/02 359/9 |
| 2014/0077525 A1 | * | 3/2014 | Yoshimura ...... | B62D 35/007 296/180.1 |

* cited by examiner

*Primary Examiner* — Firmin Backer
*Assistant Examiner* — Munear Akki
(74) *Attorney, Agent, or Firm* — Oblon, McClelland, Maier & Neustadt, L.L.P.

(57) ABSTRACT

A display system for motor vehicle comprising a display device configured to produce at least one image; and a window of said vehicle. The display device and the window are arranged such that at least a portion of the at least one image is reflected by at least a portion of the window. This allows make the portion of the image visible from outside the motor vehicle.

17 Claims, 4 Drawing Sheets

DISPLAY SYSTEM TO DISPLAY OUTSIDE THE VEHICLE

FIELD OF THE DISCLOSURE

This disclosure relates generally to information displays for motor vehicles. More particularly the present disclosure relates to a display system to display information viewable from outside the vehicle.

DESCRIPTION OF THE RELATED ART

Vehicle lights are utilized to alert other drivers and pedestrians of various signaling vehicle operations. For example, taillights of a signaling vehicle alert drivers of other vehicles located behind the signaling vehicle of vehicle operations such as, but not limited to, braking of the signaling vehicle, turning of the signaling vehicle or reversing of the vehicle.

It may be difficult to decipher what operation the signaling vehicle is making or planning on making at times. This can lead to accidents and generally decrease the level of safety on highways and roads with multiple traveling vehicles. Thus, it has been proposed to design graphical taillight systems to improve communication of vehicle operations to following vehicles, thereby improving safety. Despite their improved safety however, graphical taillight systems have not gained wide acceptance in the motor vehicle industry.

SUMMARY

Accordingly, one object of the present disclosure is to provide a vehicle communication system that increases safety with the surrounding vehicle and pedestrians.

Another object is to provide a display system that is simple and easy for vehicle manufacturers to integrate with existing vehicle designs. These and other object of the disclosure may be achieved by one or more of the following aspects.

One aspect of the present disclosure includes a display system for motor vehicle. The display system comprises a display device configured to produce at least one image and a window of said vehicle. Said display device and said window are arranged such that at least a portion of said at least one image is reflected by at least a portion of said window in order to make said portion of said image visible from outside said motor vehicle.

In this disclosure, an image represents a logo, a picture and/or icon.

In one embodiment, the display device and the window are arranged such that a plane of an image surface of the display intersects a plane of a reflecting surface of the widow to form an angle of 30° to 75°.

In one embodiment, said angle equals 45°.

In one embodiment, said at least a portion of the image is reflected by at least a portion of said window according to an axis (Y) which is substantially parallel to a road surface.

In one embodiment, said window has a reflectivity of 30% or greater.

In one embodiment, said window has a reflectivity 80% or greater.

In one embodiment, the display device has a luminance of 400 Cd/m² or greater. In one embodiment, said luminance is 1000 Cd/m² or greater.

In one embodiment, the display device is configured to provide an exterior portion of said vehicle.

In one embodiment, said exterior portion is located in a spoiler.

In one embodiment, the display device has a length ranging from 100 mm to 850 mm.

In one embodiment, the display device has a width ranging from 100 mm to 250 mm.

In one embodiment, the display device comprises at least one of an LCD display, a plasma display, an array of solid state light source, or a highly pixilated monolithic solid state light source.

In one embodiment, said at least one image is a color image.

In one embodiment, said at least one image is a moving image.

In one embodiment, the display system further comprises a control unit configured to automatically control the display of said at least one image as a function of parameters of said vehicle and/or environmental parameters.

In one embodiment, the environmental parameters includes parameters about the state the vehicle (i.e. tire pressure, engine status, . . . ) and/or weather conditions (i.e. fog, mist, temperature, . . . ) and/or state or the surroundings (e.g. potholes, bumps, animals, pedestrians, . . . ) and/or location (e.g. school, hospital, . . . ).

In one embodiment, the display system further comprises at least one sensor positioned on said vehicle, said at least one sensor being configured to evaluate the environmental parameters.

In one embodiment, the control unit comprises programmable commands configured to set the parameters of the display of said at least one image.

In one embodiment, the display system further comprises a signaling device.

Another aspect of the present disclosure includes a headlamp for a motor vehicle, comprising a display device configured to produce at least one image, a partially reflective glass of said vehicle, a lighting module configured to emit light achieving a statutory lighting function through said partially reflective glass, said display device and said partially reflective glass being arranged such that at least a portion of said image is reflected by at least a portion of said partially reflective glass in order to make said portion of said image visible from outside said motor vehicle.

In one embodiment, the display device and the partially reflective glass are arranged such that a plane of an image surface of the display intersects a plane of a reflecting surface of the partially reflective headlamp cover to form an angle of 30° to 75°.

In one embodiment, said angle equals 45°.

In one embodiment, the at least a portion of said image is reflected by at least a portion of said partially reflective glass according to a substantially horizontal axis.

Another aspect of the present disclosure includes a communication device for a vehicle, comprising a monitor able to emit light, a glass configured to reflect the emitted light in order to make the emitted light visible to a pedestrian and/or other vehicle, the emitted light comprising an image selected as a function of parameters of said vehicle and/or environmental parameters to communicate a message to said pedestrian and/or other vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

It is to be understood that terms such as "front," "rear," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

As noted above, despite their improved safety, graphical taillight systems have not gained wide acceptance in the motor vehicle industry. Known graphical taillight systems are generally conventional taillights that provide the common signaling functions to comply with government regulations, but are augmented with the capability of displaying graphical icons from the taillight. Such systems utilize a dedicated lighting module within each taillight for making the icon, and typically require a specific screen to display the information. The present inventors have recognized that such systems require additional power and signaling wires that require substantial modification of taillight wiring requirements that may become established for each vehicle manufacturer. Further, these graphical taillight systems greatly increase the cost and complexity of a vehicle taillight, and are limited in size and functionality due to its location, the module size is limited.

For example, graphical taillights generally fail to increase the safety with pedestrians because of the location of the icon display.

Figure 1:
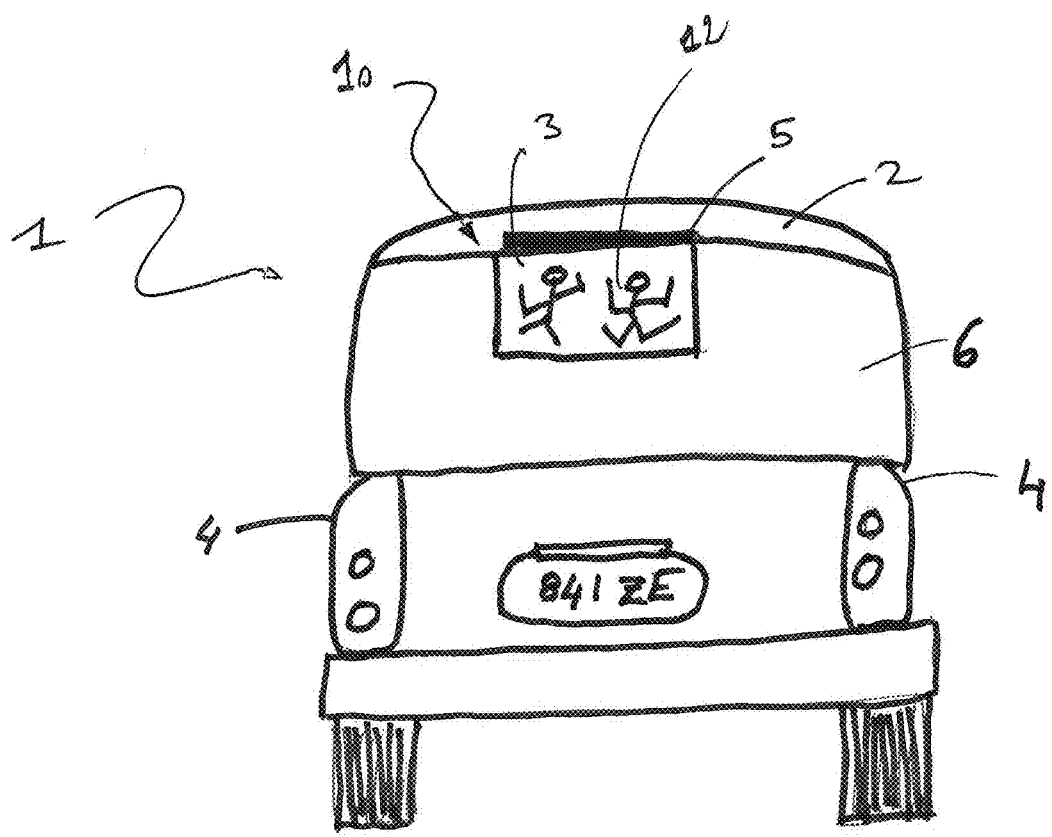
FIG. 1 is a schematic rear view of a vehicle having a display system implemented in the spoiler, according to an exemplary embodiment of the present disclosure.
Figure 2:
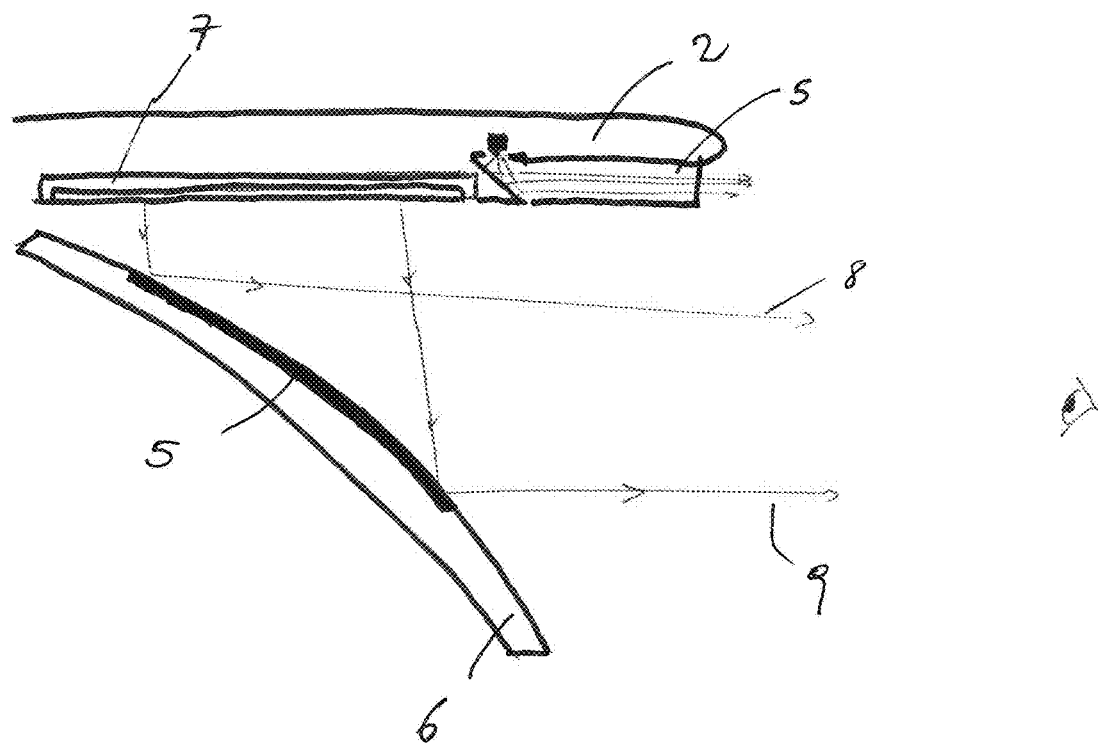
FIG. 2 is a side cross-sectional view of the display system of FIG. 1, according to an exemplary embodiment of the present disclosure.

FIG. 1 is a schematic drawing illustrating a display system in a spoiler 2 of a car 1 according to an example embodiment of the present disclosure, and FIG. 2 is a cross sectional view of the display system of FIG. 1. In the embodiment of this figure, the display system 10 includes a display device 7 and a rear window 6 of the car 1.

The display device 7 is placed in the spoiler 2 and part of the display device 7 forms an exterior portion of the spoiler 2. The display device 7 set up parallel to the road and display surface is facing the road. This layout permits a smooth and efficient integration of the display device 7 in the car 1.

The display surface of the display device 7 is therefore oriented towards the rear window 6. The display device 7 is configured to produce at least one image 12. This image 12 can be still or moving (e.g.: a movie, a gif). Furthermore the image 12 can be monochromatic like red in case of emergency, and/or multicolored. The display device and the surface display are approximately the same size. In this embodiment the display surface is 15 cm wide and 40 cm long. With this size, one can be sure to display easily large image. Larger image can be achieved with larger display surface and so display device. The display device 7 can be one or more of the following an LCD display, a plasma display, an array of solid state light source, a highly pixilated monolithic solid state light source, or any system able to display images. The display device has a luminance of about 400 $Cd/m^2$.

The display surface emits an image toward a portion of the rear window 6. The portion of the rear window then reflects at least a portion of the one image toward the rear of the vehicle. The reflection of the image from the display device is virtual therefore the driver does not see any image on the rear window whereas the reflected image is visible to anyone outside the vehicle such as pedestrian, cyclist, and/or drivers.

The display surface and rear window are placed such that a plane of an image surface of the display intersects a plane of a reflecting surface of the widow to form an angle of 30° to 75° to achieve good image view by others. The best results are obtained for an angle of about 450.

The rear window has a reflectivity of 30% or greater to make it easy to see the image from the outside of the vehicle during night drive. A higher reflectivity such that 80% or greater will make it easy to see the image day and night.

The display system further comprises a control unit which automatically controls a control the display of said at least one image as a function of parameters of said vehicle and/or environmental parameters. The environmental parameters includes parameters about the state the vehicle (e.g. tire pressure, engine status, . . . ) and/or weather conditions (e.g.i.e. fog, mist, temperature, . . . ) and/or state or the surroundings (e.g. potholes, bumps, animals, pedestrians, . . . ) and/or location (e.g. school, hospital, . . . ). The display system further comprises at least one sensor positioned on said vehicle, said at least one sensor being configured to evaluate the environmental parameters. The control unit comprises programmable commands configured to set the parameters of the display of said at least one image. This allows the following vehicles to be warned in real time of any change in the state of the vehicle or in the road conditions.

In this embodiment, the display system further comprises a central brake lamp.

In some embodiments, the display system may supplement information provided by a conventional brake lamp or turning signal. For example, the display system may provide graphical signals to indicate the rate at which the vehicle is decelerating during braking. Deceleration information may also be used to provide different graphical indicators for turning signals to indicate how soon the turn will occur.

Figure 3:
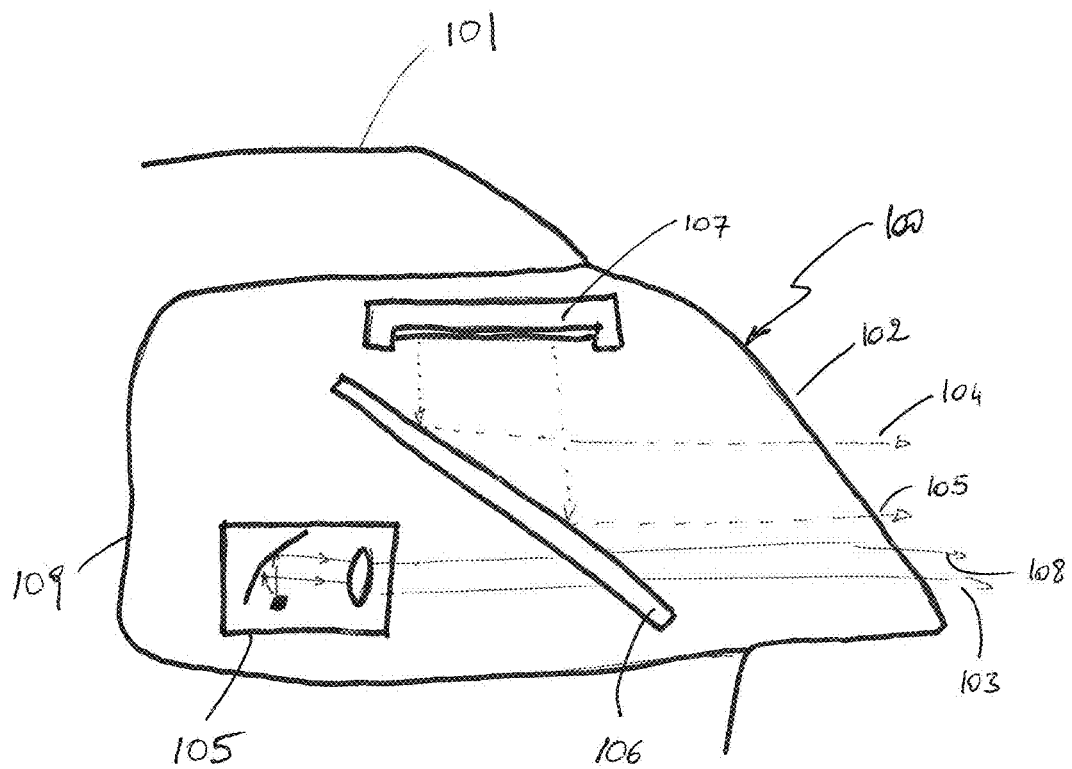
FIG. 3 is a side cross-sectional view of the display system in a headlamp, according to an exemplary embodiment of the present disclosure.

FIG. 3 is a schematic drawing illustrating a headlamp for a motor vehicle containing the second embodiment of the present disclosure. The headlamp 100, located below the car hood 101, comprises a housing 109 closed by an outer glass 102. Within the headlamp 100, a display 107 a partially reflective glass 106, and a lighting module 105 are present. The lighting module 105 is designed to achieve a statutory lighting function such as a low beam, a high beam, a parking light or a turn indicator by emitting light rays 103 and 108.

The display device 107 is set up parallel to the road and its display surface is parallel to the road. The display surface and rear window are placed such that a plane of an image surface of the display intersects a plane of the partially reflective glass 106 to form an angle of about 45°. This angle can be varied from 30° to 75°. Furthermore the partially reflective glass 106 reflects light rays 102 and 104 from the display device 107 ahead of the vehicle. So this way any image from the display device 107 reflected by the glass 106, still or moving, colored or monochromatic, is viewable by other road users.

The lighting module 105 is placed behind the partially reflective glass 106. In other word, the partially reflective glass 106 is placed between the lighting module 105 and the rear of the vehicle. When the lighting module is turned on, the emitting rays 103 and 108 are going through the partially reflective glass without being noticeably reflected. This layout allows saving room within the headlamp.

The headlamp may further comprise a control unit which automatically controls the display of images as a function of parameters of said vehicle and/or environmental parameters. Parameters of said vehicle and/or environmental parameters are the same as the ones described in the previous embodiment.

The foregoing paragraphs have been provided by way of general introduction, and are not intended to limit the scope of the following claims. The described embodiments, together with further advantages, will be best understood by reference to the following detailed description taken in conjunction with the accompanying drawings.

Figure 4:
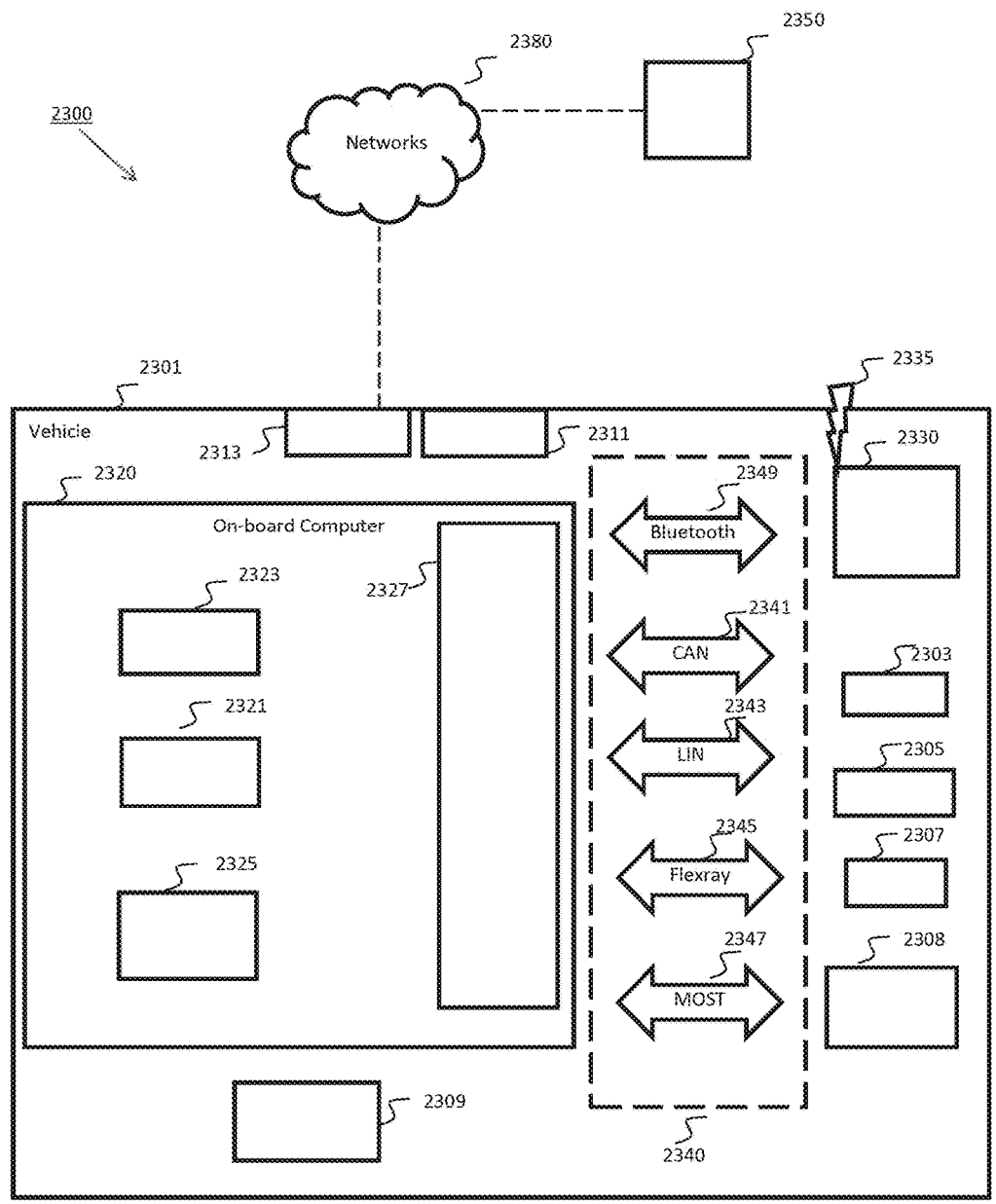
FIG. 4 is a simplified block diagram of a vehicle environment in which embodiments of the invention disclosed herein may be implemented.

FIG. 4 is a simplified block diagram of a vehicle environment in which embodiments of the invention disclosed herein may be implemented. The vehicle environment 2300 includes a vehicle 2301 in communication with one or more external devices 2350 by way of one or more external networks 2380. Vehicle 2301 also includes various internal networks 2340 for interconnecting several vehicle devices within the vehicle as will be discussed below. The vehicle environment 2300 may also include one or more in-vehicle mobile device 2330. External devices 2350 include any device located outside the vehicle 2301 such that the external device must communicate with the vehicle and its devices by an external network 2380. For example, the external devices may include mobile devices, electronic devices in networked systems (e.g., servers or clients in a local area network (LAN), etc.), on board computers of other vehicles etc. In-vehicle mobile devices 2330 are devices which are located within, or in the vicinity of the vehicle 2301 such that the in-vehicle mobile device can communicate directly with internal networks 2340 of the vehicle 2301. In-vehicle mobile devices 2330 may also connect with external networks 2380 as discussed below.

Vehicle 2301 includes vehicle devices integral with or otherwise associated with the vehicle 2301. In the embodiment of FIG. 4, vehicle devices include one or more sensors 2303, one or more actuators 2305, one or more control units 2307, one or more media systems 2308, one or more displays 2309, one or more routers 2311, one or more antenna 2313, and one or more on board computers 2320. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 2301.

Sensors 2303 detect various conditions within (or in the immediate vicinity of) the vehicle 2301. For example, sensors 2303 may be temperature sensors, photosensors, position sensors, speed sensors, angle sensors or any other sensor for detecting a diagnostic condition or other parameter of the vehicle 2301 or its ambient environment. Sensors 2303 may be passive or "dumb" sensors that provide an analog representative of the sensed parameter, or so called "smart" sensors with integrated memory and digital processing capability to analyze the parameter sensed within the sensor itself. Actuators 2305 cause motion of some mechanical element of the vehicle in response to a control signal. For example, actuators 2305 may be hydraulic actuators, pneumatic actuators or electrical/electronic actuators such as a stepper motor. Actuators 2305 may be used to move vehicle lighting devices to implement intelligent light, for example.

Actuators 2305 may also be "dumb" devices that react to a simple analog voltage input, or "smart" devices with built-in memory and processing capability. Actuators 2305 may be activated based on a sensed parameter from sensors 2303, and one such sensed parameter may be a physical position of the actuator 2303 itself. Thus, the sensors 2303 and actuators 2305 may be connected in a feedback control loop for diagnostic detection and control of the vehicle 2301.

Control units 2307 include any embedded system, processor, electronic control unit (ECU) or microcontroller. Control unit 2307 may be dedicated to a specific region or function of the vehicle 2301. For example, control unit 2307 can provide memory and control logic functions for several dumb devices, such as passive sensors 2303 and actuators 2305. In one embodiment, control unit 2307 is an ECU dedicated for controlling one or more display system or headlamp or communication device according to embodiments disclosed herein. Typically, numerous ECUs, with different embedded software, may be found in a single automobile and may communicate via internal networks as discussed below.

On-board computer 2320 is a vehicle device for providing general purpose computing functionality within the vehicle 2301. The on-board computer 2320 typically handles computationally intensive functions based on software applications or "apps" loaded into memory. On-board computer 2320 may also provide a common interface for different communication networks in the vehicle environment 2300. On-board computer 2320 includes one or more processor 2321, one or more memory 2323, one or more user interface 2325, and one or more network interface 2327. One or more display 2309 and one or more router 2311 may be an integral part of the on board computer 2310, or distributed in the vehicle and associated with the on-board computer and other vehicle devices. Separate displays 2309 may be provided in suitable locations for access by a driver and passengers in the vehicle 2301.

On-board computer 2320, and other associated or integrated components such as vehicle devices can include one or more memory element 236 for storing information to be used in achieving operations associated with control of display systems, headlamps and/or communication devices as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 2300 could be provided in any database, register, table, cache, queue, control list, or storage structure, based on particular needs and implementations, all of which could be referenced in any suitable timeframe.

In example embodiments, the operations for controlling fiber optic light devices may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 2323) can store data used for the operations described herein. This includes the memory elements being able to store software, logic, code, or processor instructions that are executed to carry out the activities described in this Specification.

Processor 2321 can execute software or algorithms to perform activities to enable control of communication devices, headlamps and/or display systems disclosed herein. A processor 2321 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 4 may be communicatively coupled to one another by one or more suitable communications medium (wired, wireless, optical) that provides a pathway for electronic communications. Any element in FIG. 4 may act as a network node in communication with any other element of FIG. 4 also acting as a network node. Any suitable network messaging protocol, network topology or network geographic scope may be included in the vehicle environment 2300. Thus, embodiments of on-board computer 10 may include one or more distinct interfaces, represented by network interfaces 2327, to facilitate communication via the various networks (including both internal and external networks) described herein. Such network interfaces 2327 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 2300 can also include suitable interfaces for receiving, transmitting, and/or otherwise communicating data or information in the vehicle environment 2300.

Multiple internal vehicle networks represented by 2340 may exist in the vehicle 2301 to provide communication pathways to various vehicle devices distributed throughout the vehicle 2301. An internal vehicle network 2340 is a collection of nodes, such as vehicle devices, integrated with or otherwise linked to the vehicle and interconnected by communication means. Vehicle networks 2340 typically include hard wired bus type networks, each providing communication pathways to particular vehicle devices distributed throughout a vehicle. FIG. 4 shows four examples of such hard wired networks: Controller Area Network (CAN) 2341, Local Internet Network (LIN) 2343, Flexray bus 2345, and Media Oriented System Transport (MOST) network 2347.

CAN bus 2341 uses a message based protocol, designed for and typically used by automotive applications. The CAN bus 2341 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 2341 may connect a transmission sensor and an energy sensor to a main engine controller, and a different CAN bus may connect the main engine controller and a main body controller to on-board computer 2320. LIN network 2343, may be used to sense external conditions such as light, or to control small mechanisms such as door locking systems. For example, LIN bus 2343 may connect a driver's seat actuator, temperature controls, and windshield wiper actuators to a main body controller of a CAN bus.

Flexray bus 2345 is typically a dedicated network for hard real-time controllers, used for drive-by-wire and/or brake-by-wire applications in which information from the engine and/or wheels of the vehicle 2301 is collected and transmitted to appropriate applications and/or data repositories. For example, Flexray bus 2345 may connect a chassis module of the vehicle 2301 to on-board computer 2320 through an appropriate interface, and/or may connect brakes and electronic stability control (ESB) to the chassis module attached to Flexray 2345 MOST network 2347 can also be found in vehicles for transmitting audio, video, and voice on fiber optics. MOST buses 2347 can connect media system 2308, to on-board computer 2320 through appropriate interfaces, and/or connect a reversing camera and a navigation system to an intermediate device which is connected to computer by MOST bus 2347.

Other hard wired internal networks such as Ethernet may be used to interconnect vehicle devices in the vehicle. Further, internal wireless networks 2349, such as near field communications, Bluetooth etc may interconnect vehicle devices.

External networks 238 may be accessed from vehicle 2301 by vehicle devices and in-vehicle mobile devices 2330 when a communication link is available. In-vehicle mobile devices 2330 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 2300. Data, may be any type of numeric, voice, video, or script data, or any type of source or object code, or any other suitable information in any appropriate format that may be communicated from one point to another in electronic devices and/or networks. A vehicle router 2311 may also be used to access external network infrastructure within range of the antenna 2313 of vehicle 2301.

Some form of wireless communication is needed to achieve external network connectivity from vehicle 2301. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 2300 via some network, and such communication may be initiated through any suitable device such as, in-vehicle mobile device 2330, display 2309, user interface 2325, or external devices 2350.

In-vehicle mobile devices 2330, and mobile devices external to vehicle 2301, may communicate with on-board computer 2320 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 232 through a USB cable or wireless network when, for example, the external mobile device is a diagnostic tool used by a mechanic for servicing vehicle 10.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While certain embodiments have been described, these embodiments have been presented by way of example only, and are not intended to limit the scope of the present disclosures. Indeed, the novel apparatuses and systems described herein can be embodied in a variety of other forms; furthermore, various omissions, substitutions and changes in the form of the apparatuses and systems described herein can be made without departing from the spirit of the present disclosures. The accompanying claims and their equivalents are intended to cover such forms or modifications as would fall within the scope and spirit of the present disclosures.

What is claimed is:

1. A display system for a motor vehicle comprising:
   a window of said vehicle, the window including an interior face and an exterior face; and
   a display device configured to produce at least one image and oriented to face a road surface,
   wherein said display device and said window are arranged such that at least one portion of said at least one image is reflected by at least the exterior face of a portion of said window in order to make said at least one portion of said image visible from outside said motor vehicle, and
   wherein the at least one portion of said image is selected as a function of parameters of said vehicle and/or environmental parameters to communicate a message to said pedestrian and/or other vehicle.

2. The display system of claim 1, wherein the display device and the window are arranged such that a plane of an image surface of the display intersects a plane of a reflecting surface of the widow to form an angle of 30° to 75°.

3. The display system of claim 1, wherein said at least a portion of the image is reflected by at least a portion of said window according to an axis which is substantially parallel to the road surface.

4. The display system of claim 1, wherein said window has a reflectivity of 30% or greater.

5. The display system of claim 4, wherein said window has a reflectivity 80% or greater.

6. The display system of claim 1, wherein the display device has a luminance of 400 $Cd/m^2$ or greater.

7. The display system of claim 6, wherein said luminance is 1000 $Cd/m^2$ or greater.

8. The display system of claim 1, wherein the display device is configured to provide an exterior portion of said vehicle.

9. The display system of claim 8, wherein said exterior portion is located in a spoiler.

10. The display system of claim 1, wherein the display device comprises at least one of an LCD display, a plasma display, an array of solid state light source, or a pixilated monolithic solid state light source.

11. The display system of claim 1, wherein said at least one image is a color image.

12. The display system of claim 1, wherein said at least one image is a moving image.

13. The display system of claim 1, further comprising a control unit configured to automatically control the display of said at least one image as a function of parameters of said vehicle and/or environmental parameters.

14. The display system of claim 13, further comprising at least one sensor positioned on said vehicle, said at least one sensor being configured to evaluate the environmental parameters.

15. The display system of claim 13, wherein the control unit comprises programmable commands configured to set the parameters of the display of said at least one image.

16. The display system of claim 1, further comprising a signaling device.

17. An assembly for a vehicle, comprising:
   a spoiler including a brake lamp and a monitor able to emit light, the brake lamp and the monitor arranged to be housed within the spoiler, the monitor oriented to face a road surface; and
   a glass including an exterior surface and an interior surface, the exterior surface configured to reflect the emitted light in order to make the emitted light visible to a pedestrian and/or other vehicle,
   wherein the emitted light comprising an image is selected as a function of parameters of said vehicle and/or environmental parameters to communicate a message to said pedestrian and/or other vehicle.

* * * * *